Figure 1:
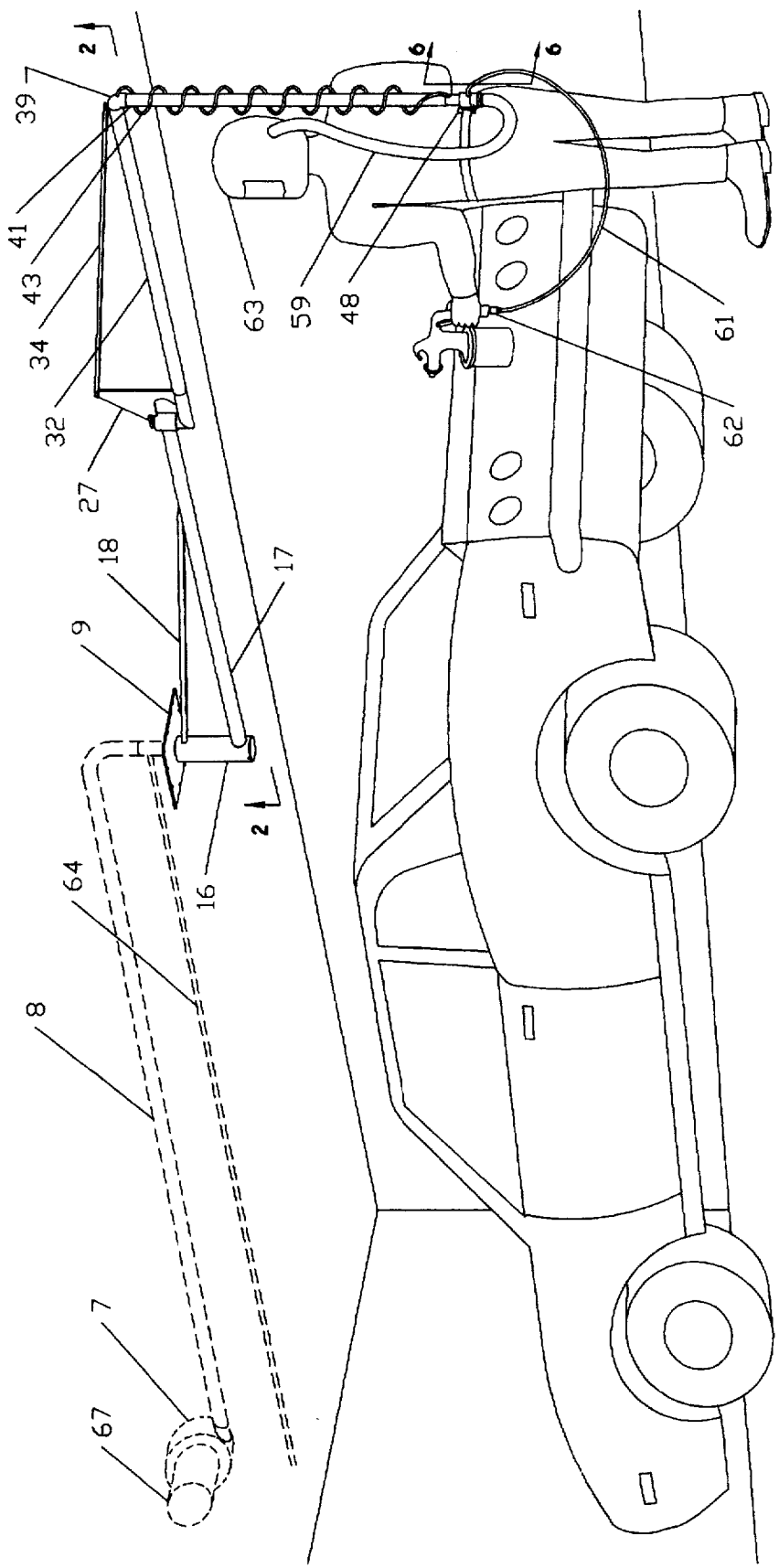

United States Patent [19]
Funicello

[11] Patent Number: 5,758,687
[45] Date of Patent: Jun. 2, 1998

[54] DUAL ARM OVERHEAD AIR SUPPLY SYSTEM

[76] Inventor: John C. Funicello, 5119 Stagecoach Rd., Ellenwood, Ga. 30049

[21] Appl. No.: 645,289

[22] Filed: May 13, 1996

[51] Int. Cl.[6] .................................................... F17D 1/02
[52] U.S. Cl. .......................... 137/615; 137/357; 2/171.3; 141/387
[58] Field of Search ........................ 137/615, 357; 141/387, 388, 389; 2/171.3, 410, DIG. 1

[56] References Cited

U.S. PATENT DOCUMENTS

| | | | |
|---|---|---|---|
| 2,011,375 | 8/1935 | Rohan | 137/357 X |
| 2,509,120 | 5/1950 | Warren | 137/615 |
| 2,720,217 | 10/1955 | Vossbrinck | 141/388 X |
| 3,381,711 | 5/1968 | Fye et al. | |
| 4,131,132 | 12/1978 | Zierden | 137/615 |
| 4,658,874 | 4/1987 | von Meyerinck et al. | 141/387 |
| 5,005,216 | 4/1991 | Blackburn et al. | 2/DIG. 1 |
| 5,533,500 | 7/1996 | Her-Mou | 2/410 X |

*Primary Examiner*—Kevin Lee

[57] ABSTRACT

An overhead dual arm tubular structure for supplying fresh and/or pneumatic air power to an operator and/or his air tool in a work area of varying shape. A structure whose main arm is freely revolvable about its vertical axis has a second arm of similar length swinging radially from its free end. Self returning hoses carrying air down from the second arm's outward end, enable an operator to work high or low anywhere within the periphery of the dual arm radius. A belt clip hanging at the end of the self returning hoses incorporates a quick release mechanism and hose swivels to allow the operator to easily engage and disengage from his fresh air supply and revolve freely about the attached fresh and/or compressed air hoses without risk of entanglement.

9 Claims, 6 Drawing Sheets

DUAL ARM OVERHEAD AIR SUPPLY SYSTEM

BACKGROUND—FIELD OF THE INVENTION

This invention relates to a method of conveying one or both pneumatic power and ventilation air from a dual arm overhead supply system to a worker below for purposes of allowing him unrestricted movement in a work area, with power for his air tool, and where required clean fresh air piped into a breathing apparatus.

BACKGROUND—DESCRIPTION OF PRIOR ART

The prior art overhead supply systems were set up to provide only one form of power, with limited movement, in a work area. In the power supply, U.S. Pat. No. 3,381,711 to Carl W. Fye, 1968 May 7, pneumatic power was supplied from one rotating arm to an air tool being used by an operator below. When working inside, or outside of the radius of the single arm, whose length had to be manually adjusted, the air hose would become quite taut pulling laterally at the power tool the operator was using, thus limiting its movement. Another disadvantage, being that it is a single arm, it is not desirable for rectangular work areas, while the overhead dual arm system described here will supply air in work areas of most any shape and allow the operator to breath clean air.

OBJECT OF THE INVENTION

One of the primary objects of this invention is allow an operator unrestricted movement within a work area to use his pneumatic power and/or ventilation air from the dual arm overhead supply system.

Another object of this invention is to provide a hose carrier with a low moment of inertia, allowing the operator to move with little noticeable resistance from the attached ventilation hose and/or pneumatic power supply hose he is using.

Another object of this invention is to provide safe, clean air for the worker by using a ventilation air hose attached to oneself and utilized through use of a hood or respirator.

Another object is to provide a dual arm overhead power supply whose main arm is centrally located, and revolvable any number of times within a work area.

Another object of this dual arm power supply is to have the second arm almost fully revolve about the end of main arm, and be of similar length, so the supply lines hanging down vertically from its end, can reach from the center pivot point all the way out to the full dual arm length, without causing any significant lateral pull from the self returning air supply lines.

Another object of this invention is to allow vertical movement of the belt clip attached to the operator through use of self returning hoses, thus allowing the operator to work high or low depending on the work being done.

Another object of this invention is to have the supply lines follow the operator wherever he moves in a work area, by using a belt clip at the end of the self returning air lines.

Another object is to provide the operator a ventilation hose secured to his belt that is quickly detachable.

Another object is to provide a simple disconnect on the belt clip, for the short hose, that connects to the hood or respirator.

Another object is to combine the belt attachment feature and the disconnect feature for the hood ventilation air hose into one simple latch mechanism.

Another object is to allow the operator to freely rotate about the attached self returning air hoses through use of rotary swivel joints housed in the belt clip.

Another object of this invention is to provide a tubular dual arm structure, that with minimal changes can be configured for most any size work area.

Another object of this invention is to utilize the tubular structure comprising the two arms to provide passage for ventilation air and act as a hose carrier for the pneumatic power line.

Another object, through utilizing the voluminous structure of the connected tubes for ventilation air, is that an inexpensive low pressure electric blower can be used instead of a more expensive oil-less air compressor that is presently used for most ventilated hoods or respirators.

Another object is to provide a ventilation air system where the intake for the blower would be remotely mounted to draw in safe clean filtered air.

These and other objects will be apparent from the detailed description of the invention which:

FIG. 1 shows the perspective view of the overhead supply system as it would be used in a work area.

Figure 2:
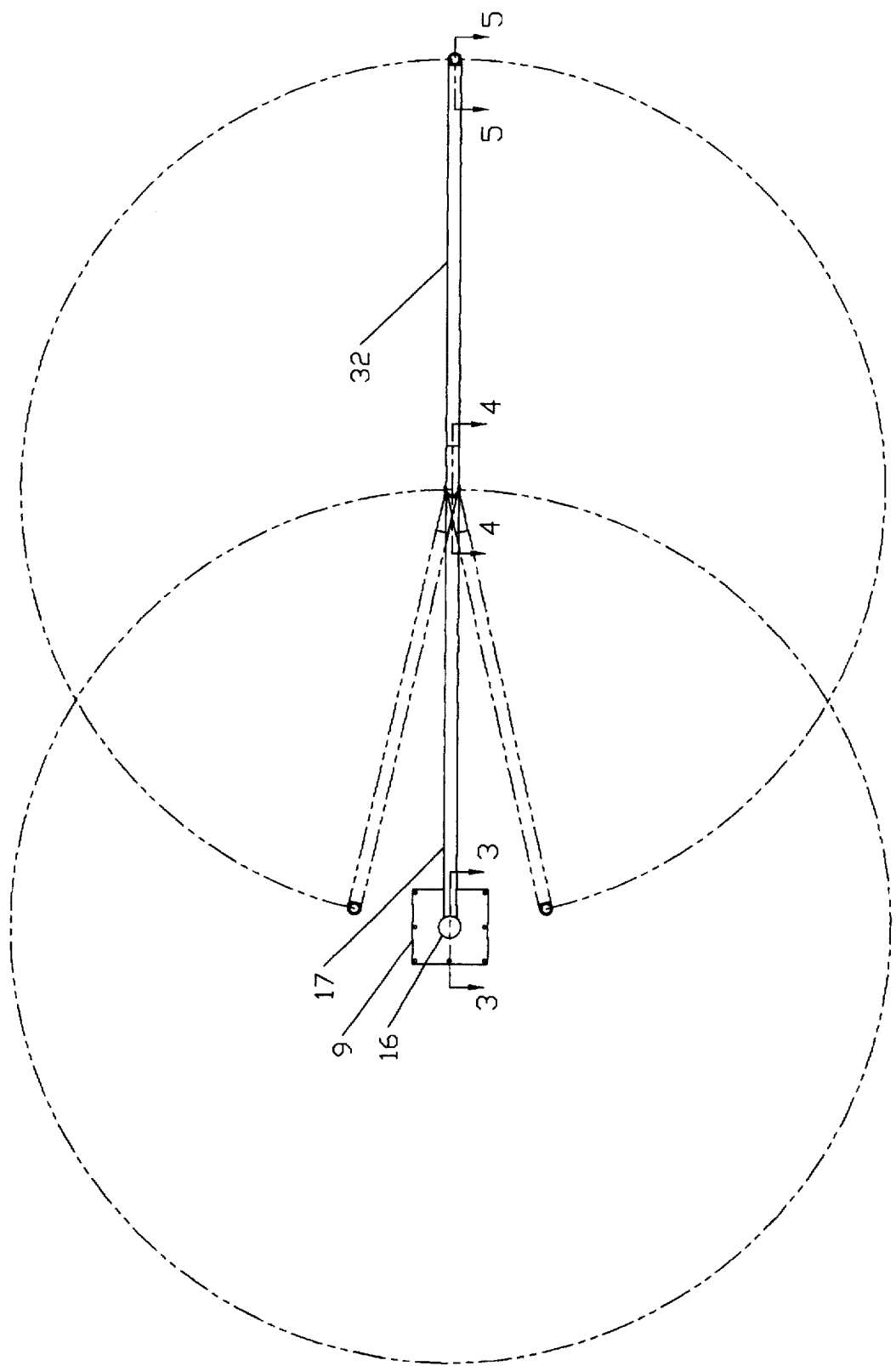

FIG. 2, taken from FIG. 1 view 2—2, shows the range of movement of the dual arm structure.

Figure 3:
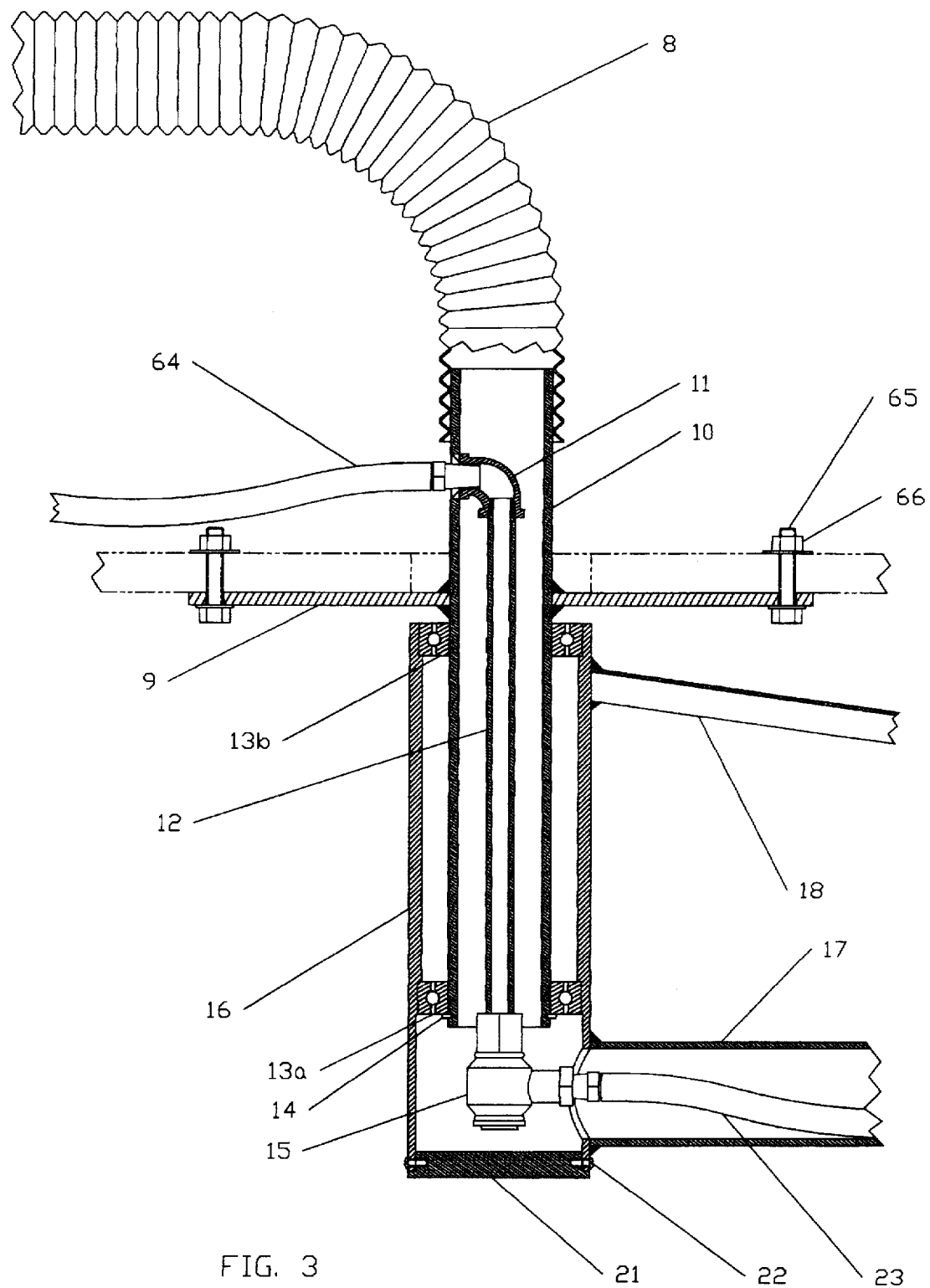

FIG. 3, taken from FIG. 2 section 3—3, is section view of the main joint as it would be mounted to the ceiling in a work area.

Figure 4:
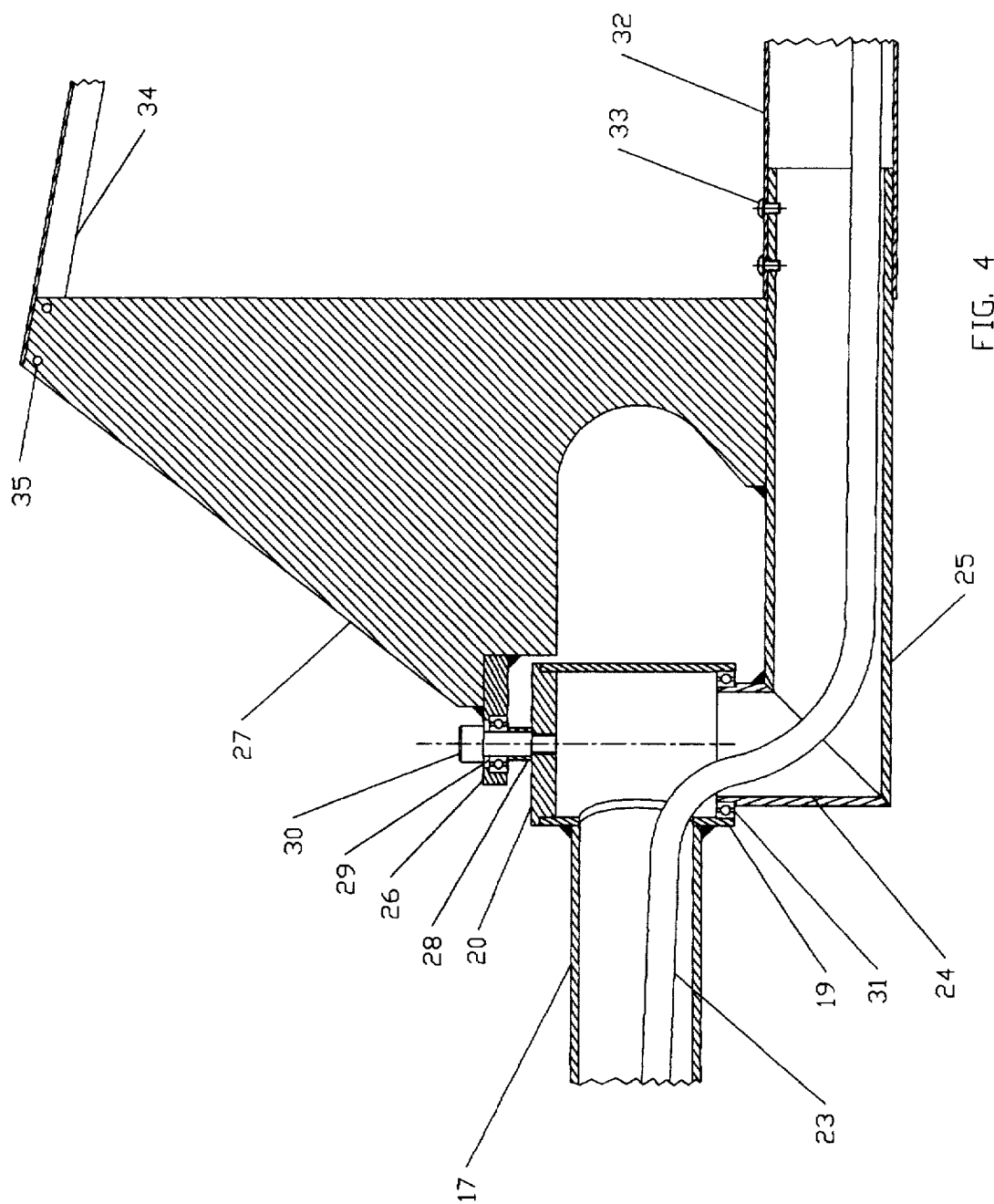

FIG. 4, taken from FIG. 2 section 4—4, is section view of the second joint showing how the second arm connects to the main arm.

Figure 5:
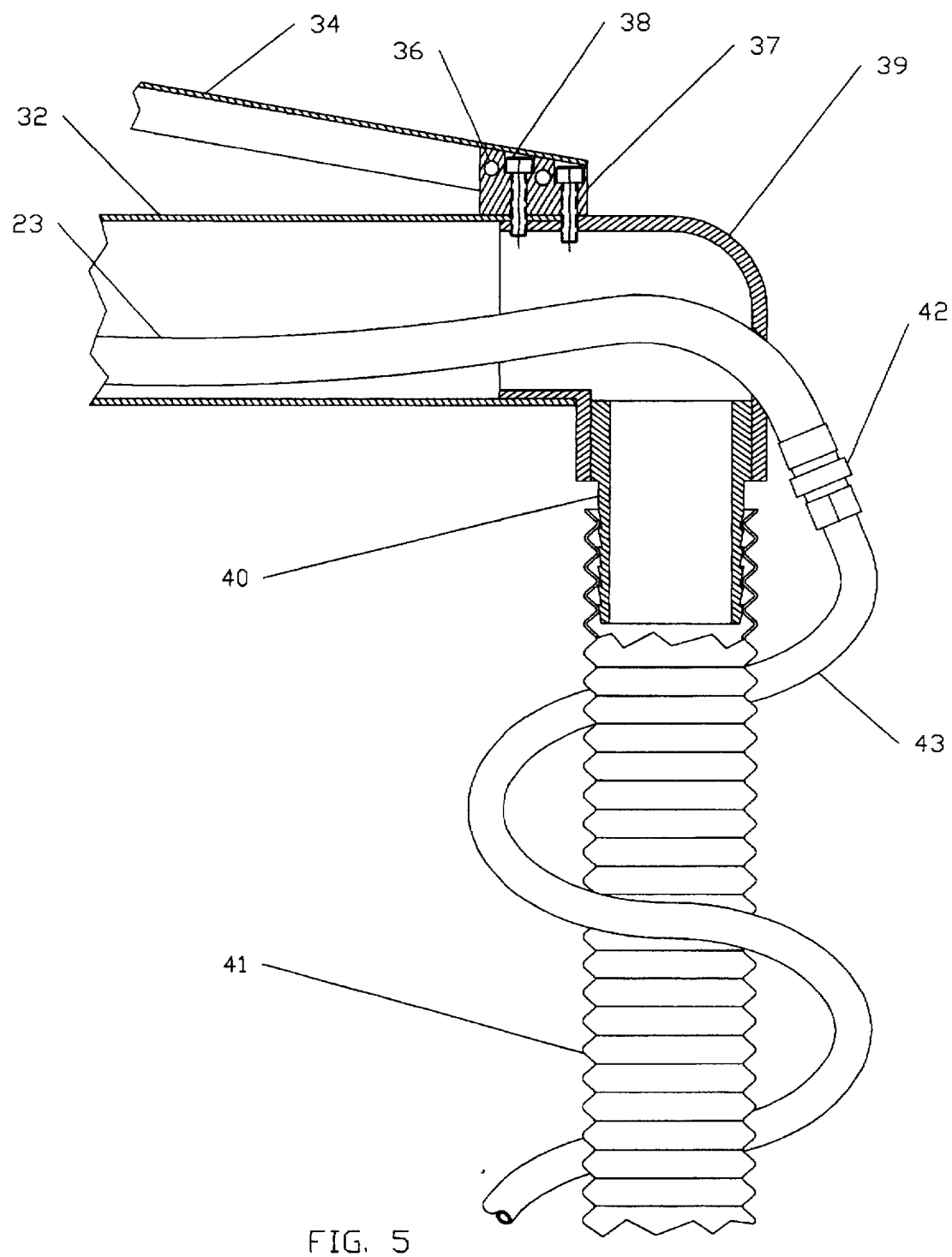

FIG. 5, taken from FIG. 2 section 5—5, is section view of the hose turn down showing how the self returning hoses attach to the end of the second arm.

Figure 6:
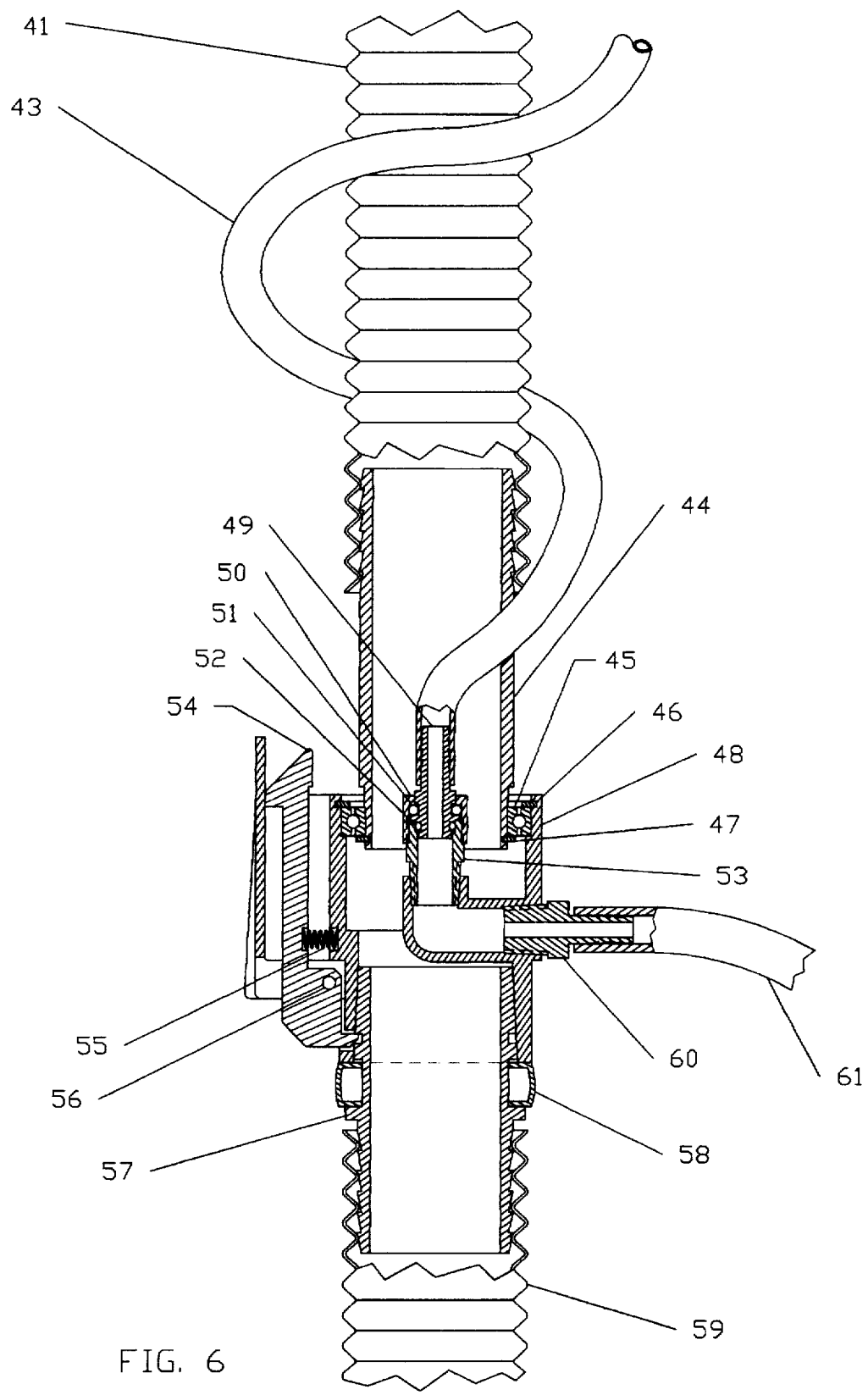

FIG. 6, taken from FIG. 1 section 6—6, is a section view of the belt clip showing details of the swivel joints and latch mechanism.

The following will be description of the construction and mounting of one embodiment of a dual arm overhead fresh and compressed air supply system. To begin with, in FIG. 3, a mounting plate 9 is mounted to the ceiling using bolts 65 and nuts 64. The plate 9 is mounted central in the work area. A spindle tube 10 is welded into a hole in mounting plate 10 and passes through hole in the ceiling. Attached to the top of the spindle tube 10 is a ventilation hose 8. It connects to an electric blower 7, shown in FIG. 1. Blower 7 would normally be mounted away from the work area, with a dust filter 67 on its intake, so it could draw in fresh clean air. A compressed air line 64 threads into a pipe elbow 11 that is welded in a hole on spindle tube 10. A pipe nipple 12 threads into the bottom of pipe elbow 11. Threaded onto the bottom of pipe nipple 12, a right angle swivel fitting 15 allows for rotary movement of the attached air hose 23.

Mounted about the spindle tube 10, and riding on sealed radial bearings 13a and 13b, is a rotor tube 16. A retaining ring 14 supports the lower radial bearing 13a which is pressed into a counterbore in rotor tube 16. Sealing the counterbore in rotor tube 16, and held in place by screws 22, is the tube plug 21. The upper radial bearing 13b is pressed into a counterbore in the top of tube 16. Extending outward, and welded to the rotor tube 16, is the main arm tube 17. Main support channel 18 is welded to both the rotor tube 16 and the main arm tube 17 to form a truss. In FIG. 4 a pivot tube 19 is welded at the end of tube 17. A pivot disk 20, pressed into the top of pivot tube 17, has a tapped hole in its center for anchoring a shoulder screw 30. Riding on shoulder screw 30, above a bearing spacer 28, a sealed radial bearing 29 is pressed into a counterbore in the bottom of a pivot block 26. A sealed radial bearing 31 is pressed into a counterbore in the bottom of pivot tube 19. Sliding into the bore of bearing 31, an elbow tube 24 is welded to a gusseted tube 25. A gusset plate 27 is welded to both pivot block 26 and gusseted tube 25. Sliding over the end of tube 25, and held in place by screws 33, a second arm tube 32 extends outward to a turn-down elbow 39 in FIG. 5. Turn-down elbow 39 is held in place by screws 38 running through an anchor block 37. A support channel 34 is pinned at both ends with dowel pins 35, in FIG. 4, anchoring it to gusset plate 27 and dowel pins 36, in FIG. 5, anchoring it to anchor block 37. A hose fitting 40 is glued into the bottom of turn-down elbow 39. Attached to the barbed end of hose fitting 40, a self-retracting hose 41 runs down and attaches to the barbed end of a hose swivel tube 44 in FIG. 6. The self-retracting hose 41 has an integral metal extension spring helix that causes it to retract. A radial bearing 45 is pressed onto the turned down end of hose swivel tube 44 and held in place by a retaining ring 47. Bearing 45 is pressed into a counterbore in a belt clip/swivel housing 48 and held in place by a retaining ring 46.

The belt clip/swivel housing 48 is a molded one piece unit incorporating the feature for clipping to the belt, as well as the internal elbow for the compressed air. It also has a tapered bore in the bottom for accepting the matching tapered male end of the hose disconnect fitting 57. The disconnect latch pawl 54 resides in a slot in belt/clip swivel housing 49 and pivots about dowel pin 56. Latch spring 55 holds the upper hooked end of disconnect latch pawl 54 against the flanged belt hook feature of the belt clip/swivel housing 48. The lower hooked end of the disconnect latch pawl 54 engages the groove in hose disconnect fitting 57 holding the fittings male taper against the female taper of the belt clip/swivel housing 48. This holding action compresses the unshaped construction of rubber gasket 58 that resides in a groove in hose disconnect fitting 57. Rubber gasket 58 acts as a spring to release the hose fitting 57 when the disconnect latch pawl 54 is pulled.

Running through the tubes of the main and second arms, in FIGS. 3, 4 and 5, the air hose 23 exits through a hole in turn-down elbow 39. Air hose 23 couples with self-coiling hose 43 using coupling 42. Coiling down around the outside of self-retracting hose 41 with its preformed plastic coils, the self-recoiling hose 43 enters a hole in hose swivel tube 44 and attaches to the barbed end of straight hose swivel fitting 49. Flare nut 50, mounted to swivel base fitting 53, holds in ball bearings 51. These captured bearings ride against the flanged surface of straight hose swivel fitting 49, to form a thrust bearing against the forces generated by internal air pressure. This air pressure is held in by o-ring 52, that fits into a groove of straight hose swivel fitting 49 and rides against a counterbore in swivel base fitting 53. Swivel base fitting 53 threads into the molded-in elbow feature of the belt/clip swivel housing 48. Barbed hose fitting 60 threads into the other end of the elbow feature of belt clip/swivel housing 48. Air tool hose 61 attaches to barbed hose fitting 60 and runs out to the quick disconnect fitting 62. This air tool hose is of sufficient length to allow the operator complete arm movement when the belt clip/swivel housing is clipped to his belt. The quick disconnect fitting 62 connects to the mating fitting of the air tool being used.

The following will be a description of the operation of the dual arm compressed and fresh air supply system. To start, in FIGS. 1, the filtered fresh air is pushed through ventilation hose 8 by electric blower 7. In FIG. 3, this fresh air passes through spindle tube 10, into rotor tubes 16, and then into main arm tube 17. Together rotor tube 16 and main arm tube 17 rotate freely around spindle tube 10 on radial bearings 13a and 13b. The fresh air flows down main arm tube 17 and into pivot tube 19 in FIG. 4. Traveling down pivot tube 19 and into elbow tube 24 the fresh air then flows outward through gusseted tube 25 and into second arm tube 32. Second arm tube 32 and the weldment formed by components pivot block 26, gusset plate 27, gusseted tube 25, and elbow tube 24 pivot about the main arm on sealed radial bearings 29 and 31. The second arm tube 32 pivots freely in either direction almost 180 degrees as shown in FIG. 2. Its travel is limited by the contact of gusset plate 27 with the main arm tube 17, shown in FIG. 4. The fresh air continues down second arm tube 32 to the turn-down elbow 39 in FIG. 5. From here the air flows down hose fitting 40 into self-retracting hose 41. The air flows down self-retracting hose 41 into attached hose swivel tube 44 in FIG. 6. Belt clip/swivel housing 48 rotates freely around hose swivel tube 44 on sealed radial bearing 45. Self-retracting hose 41, with its spring helix, maintains tension on belt clip/swivel housing. This tension causes the second arm to follow the operator shadowing him, as he walks around in a work area. Its vertical travel allows the operator to work high in a standing position or low laying down on the floor, depending on the work requirements. The fresh air continues on through belt clip/swivel housing 48 and into hose disconnect fitting 57. The tapered hose disconnect fitting 57 is held upward in place by disconnect latch pawl 54 compressing u-shaped rubber gasket 58. The latch 54, pivoting about dowel pin 56, and held in lock position by latch spring 55, releases the operators belt and hose disconnect fitting 57 simultaneously, when it is pulled inward against the spring 55. With the disconnect fitting 57 up in its locked position, the fresh air continues on through the attached hood hose 59, and into the supplied air hood 63. This fresh air maintains a positive pressure differential inside the hood, thus preventing any fumes or dust from entering it.

In FIG. 3 compressed air enters pipe elbow 11 from compressed air line 64. Compressed air travels down pipe nipple 12 and into right angle swivel fitting 15. Compressed air passes from this swivel 15 into air hose 23. Air hose 23 routed through the tubing of the main and second arms exits through a hole in turn-down elbow 39, in FIG. 5. Here it couples with self-coiling hose 43 through use of hose coupling 42. The self-coiling hose 43 coils down around self-retracting hose 41 to allow vertical travel. In FIG. 6 hose 43 passes through a hole in hose swivel tube 44 and attaches to straight hose swivel fitting 49. Compressed air passing through straight hose swivel fitting 49 and into swivel base fitting 53 is sealed in by o-ring 52. Ball bearings 51, held in place by flare nut 50, act as a thrust bearing allowing swivel base fitting 53 to revolve freely around straight hose swivel fitting 49 when under full air pressure. The compressed air passes on through the internal elbow feature of the belt clip/swivel housing 48. From there the compressed air passes through the barbed hose fitting 60 into the air tool hose 61 and then out to the air tool quick disconnect fitting 62 shown in FIG. 1. By combining both hose swivels into the belt clip/swivel housing 48 the operator and his air tool are able rotate freely about the self returning hoses without risk of entanglement.

Accordingly the reader will see that the dual-arm overhead fresh and compressed air supply is easily and conveniently used in work areas of varying requirements. The fresh air feature allows the operator to freely and safely work in dusty, fume contaminated areas, such as autobody repair, welding, boat repair, and furniture building shops while having ready access to the compressed air for running air tools. While the above description contains many specificities, these should not be construed as limitations on the scope of the invention, rather as an exemplification of the preferred embodiment thereof. Many other variations are possible. For example the self-coiling hose running down around the outside of the self-retracting hose could just as easily run inside the self-retracting hose if its coil diameter was smaller. The air coming into the blower could be heated or cooled to provide fresh air at room temperature. Also this system could use a clean air source such as an oil-less air compressor or an air tank to provide fresh air. The hood used in supplying the operator with fresh air could be replaced with a half or full face respirator. The whole system could be built without the compressed air feature by simply eliminating the compressed air line, hoses, and fittings. And just as true, the system could be built without the fresh air line and just have one compressed air line supplying an air tool. Furthermore, this single compressed air line could be split off at belt clip, with one sides air pressure being regulated down and purified to provide breathable air. Accordingly, the scope of the invention shall not be determined by the embodiment illustrated, but by the appended claims and their legal equivalents.

What I claim is:

1. A dual arm overhead air supply system for supplying fresh air to a breathing apparatus worn by a worker comprising a main arm rotating around a vertical axis, mounted overhead in a chosen work area, with a second arm swinging radially within said work area from an outer end of said main arm, with said main and second arms carrying fresh air to an outer end of said second arm to a down turn, from said down turn a hose having a swiveling means connects through an operator attachment means to a breathing apparatus.

2. A system according to claim 1, wherein said operator attachment means has a quick release means to easily disengage said worker from said attachment means.

3. A dual arm overhead fresh and compressed air supply system for supplying fresh and compressed air to a worker comprising a freely rotatable main arm mounted overhead in a work area, with a second arm swinging radially from an outer end of said main arm, whose said main and second arms carry the fresh and compressed air in separate lines to an outer end of said second arm to a down turn, attached to said down turn, two hoses having a swiveling means carry separately said fresh and compressed air to an operator attachment means, allowing said worker to rotate freely about said hoses, with said fresh air conducted to a breathing apparatus on the worker and said compressed air conducted in a separate airline from said attachment means to an air tool.

4. A system according to claim 3, wherein said operator attachment means has a quick release means to easily disengage the worker from said attachment means.

5. A system according to claim 3, wherein said fresh air is generated from an electric blower or other air pressurization means to provide the worker with air for breathing.

6. A system according to claim 3, wherein said breathing apparatus is comprised of a hood, or a full or half-face respirator.

7. A system according to claim 3, wherein said hoses are comprised of two self-coiling hoses each constructed of preformed plastic coils, with one said hose carrying said compressed air and the other carrying said fresh air to said operator attachment means.

8. A system according to claim 3, wherein said hoses are comprised of one self-coiling hose, constructed of preformed plastic coils, carrying said compressed air down with the other, a self-retracting hose, consisting of a plastic hose with an integral extension spring helix, carrying said fresh air to said operator attachment means.

9. A system according to claim 3, wherein said operator attachment means comprises a belt clip for attaching to a belt of said worker, with a latch mechanism for both releasing said belt and the breathing apparatus fresh air hose simultaneously, with a swivel means for said hoses supplying fresh and compressed air.

* * * * *